April 22, 1952     H. E. BAKER     2,593,830
LIQUID SAMPLER
Filed Feb. 21, 1948
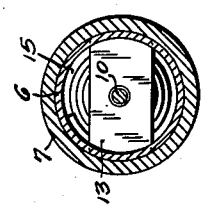
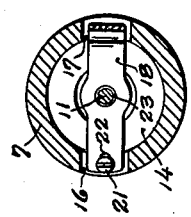
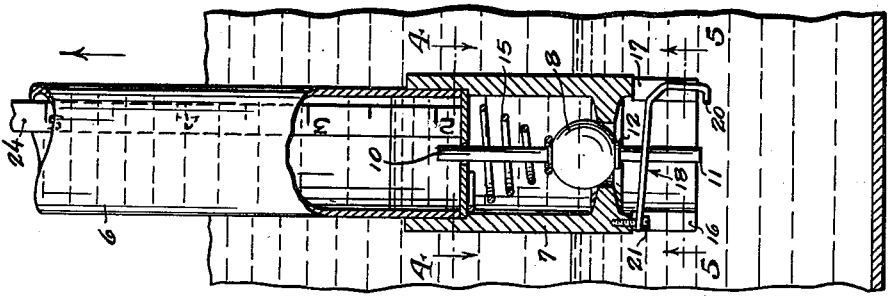
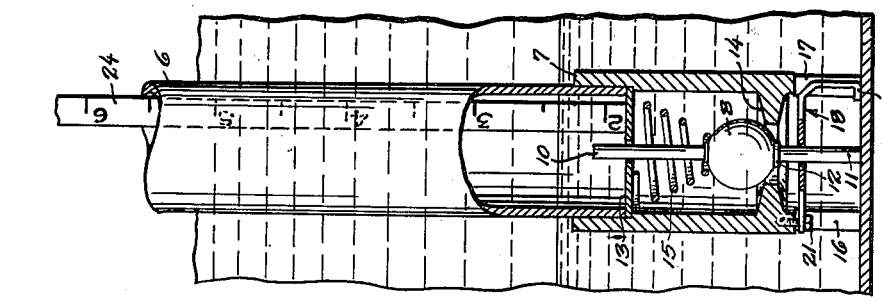
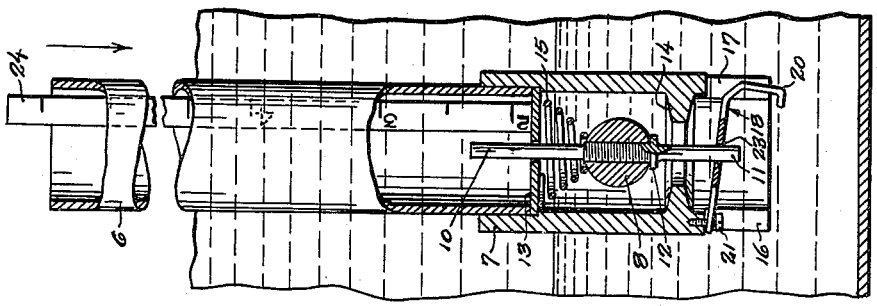
INVENTOR.
Harry E. Baker
BY
ATTORNEYS.

Patented Apr. 22, 1952

2,593,830

UNITED STATES PATENT OFFICE 2,593,830

LIQUID SAMPLER

Harry E. Baker, Seattle, Wash.

Application February 21, 1948, Serial No. 10,149

7 Claims. (Cl. 73—425.4)

This invention relates to a sampling device for use in taking "core" specimens of the liquid contained in tanks. While the nature of the dominant liquid which the tank contains is unimportant, and which is to say that the present instrument is applicable to the taking of samples of substantially any character of liquid body, the invention particularly lends itself to use in determining the quantity of water present in a tank of oil.

Clarity in an understanding of the invention will perhaps be advanced by here stating that the liquid-sampling device of the present invention is of that nature providing an open-top tubular casing arranged to be lowered from above through the contained liquid of the tank into engagement with the floor of the latter and having a spring-closing valve at the bottom which is releasably held in open condition during the lowering stage, the releasing means being activated automatically upon engagement with the floor but the arrangement of parts being such that the valve fully closes only by the act of raising the instrument a fractional distance off the floor of the tank in the operation of withdrawing the sample of liquid which has been taken.

It is the object of the invention to provide a perfected instrument for the described purpose which is of simple and inexpensive construction, which may be easily operated, and which, in use, will insure that the sample "core" of liquid will accurately picture the true condition of the tank's contents.

Other more particular objects and advantages will, with the foregoing, appear and be understood in the course of the following description and claims, the invention consisting in the novel construction and in the adaptation and combination of parts hereinafter described and claimed.

In the accompanying drawings:

Figure 1 is a vertical sectional view with parts in elevation illustrating an instrument constructed in accordance with the preferred embodiment of the present invention, the instrument, with its valve set in open position, being here shown in course of being lowered through a body of liquid or liquids contained in a tank. The liquid contents of the tank, as portrayed in this view and also in Figs. 2 and 3, are indicated as comprising two distinguishable liquid bodies, as oil and water.

Fig. 2 is a sectional view similar to Fig. 1 but showing the instrument with the valve partially closed after it has reached and rests upon the bottom of the tank.

Fig. 3 is a similar section portraying the instrument in course of being raised and illustrating a liquid "core" as having been trapped therein.

Fig. 4 is a horizontal sectional view on line 4—4 of Fig. 3; and

Fig. 5 is a horizontal sectional view on line 5—5 of Fig. 3.

According to the present invention there is provided a tubular body indicated by the numeral 6 and which is composed, by preference, of Plexiglas or other transparent material. The tube is open top and bottom and has a cylindrical member 7, likewise preferably of Plexiglas composition, sleeved upon and extending as an axial prolongation from the lower end thereof. This member 7, which is cemented or otherwise rigidly secured to the tube, serves as a casing for a ball valve 8, and supporting the ball valve is a stem which projects top and bottom beyond the ball, the stem sections being denoted 10 and 11. The ball is threaded upon the stem and the connection is made secure by bringing the ball firmly to bear upon a collar-forming flange 12 located at the base of the threads.

In adapting the valve casing to the tubular body, the casing is counter-bored from its upper end, and securely caught by its ends between the annular ledge thereby produced and the bottom end of the inserted tube is a cross-bar 13 pierced with a center aperture serving as a guide for the valve's upper stem section 10. Located below the ledge, and forming a seat for the valve, there is presented within the casing an annular internal flange 14, and for yieldingly urging the valve into its seated position there is provided a spring 15 bearing by its head end against the underside of the cross-bar 13. The pressure load of this spring is comparatively light. The lower stem section 11 of the valve is given a length sufficient, upon a seating of the valve, to cause the stem to project very slightly below the lower limit of the casing.

Upon its bottom end, the valve casing presents diametrically opposed slots, as 16 and 17, and there is carried by the casing to extend diametrically from one to the other said slot a trip-foot 18 presenting a downturned toe 20. This trip-foot is attached at its heel end only, and the attachment, which is indicated as comprising a pin 21 passing through a slot 22, is of a loose nature permitting the free toe of the foot to float freely within a limited path of vertical movement which, at its lowest extreme, places the toe somewhat below the plane occupied by the tip of the stem section 11 when the valve occupies its seated position. At a point more or less central to its length, the trip-foot presents an aperture 23 through which the stem section 11 extends and which is produced to a diameter somewhat larger than that of the stem section.

The over-all length of the tube and its integrated valve casing need only be such as to rise above the floor of the liquid-containing tank a distance exceeding the critical height to which water may rise before reaching a danger point, and which is to say that it is of no moment to the taking of an accurate test "core" whether the head end of the tube projects above the surface level of the oil. There is perforce attached to the tube a stick or other suitable means for raising or lowering the same.

In setting the valve for use, the same is lifted off its seat by finger pressure applied to the exposed tip of the stem section 11, and the free end of the trip-foot is coincidently brought downwardly into the position in which it is shown in Fig. 1. This angular positioning of the foot causes the bottom front edge and the top back edge of the foot's center aperture 23 to contact the stem section 11 and, as pressure of the finger is withdrawn from the stem, the depressive force of the spring creates a binding action which frictionally holds the valve in its elevated position. The operator then lowers the tube through the liquid contents of the tank and, in course of such lowering, admits through the bottom opening a true sample of each level which is traversed. Upon striking the bottom of the tank, the trip-foot is raised to responsively free the stem section 11 of its binding restraint whereupon the pressure of the released spring 15 acts upon the valve to urge the latter toward its seat. Inasmuch, however, as the tip of the stem section 11 is moved downwardly in course of this closing action to a point whereat the same is exposed beyond the lower limit of the valve casing, the valve remains slightly open while the instrument rests upon the bottom (see Fig. 2) and there is consequently no disturbance of the core incident to the closing action of the valve, the final closing being free of any slap and taking place instantly as the instrument is raised, for withdrawal from the tank, a fractional distance off the floor of the latter. As a reading gauge for the instrument, the tube 6 may have graduated surface markings cut into the same, or a removable gauge such as I indicate by the numeral 24 may be provided.

It is thought that the invention and the manner of its usage will have been clearly understood from the foregoing detailed description of my now-preferred illustrated embodiment. It is self-evident that minor changes in the details of construction can be resorted to without departing from the spirit of the invention, and it is accordingly my intention that no limitations be implied and that the hereto annexed claims be read with a scope fully commensurate with the broadest interpretation which the employed language fairly permits.

What I claim is:

1. In a liquid-sampling instrument for use in a tank to determine the level of a bottom liquid having a specific gravity higher than that of a principal body of liquid contained in the tank, a casing open at the head end and providing an admission opening at its lower end, a closure valve for said admission opening, means releasable by contact of the instrument with the floor of the tank for holding the valve in a fully open position, and means made responsive to a valve-releasing activation of the first said means and functioning only while the instrument rests upon the floor of the tank for holding the valve in a predetermined partially open position.

2. In a liquid-sampling instrument for use in a tank to determine the level of a bottom liquid having a specific gravity higher than that of a principal body of liquid contained in the tank, a casing open at the head end and providing an admission opening at its lower end, a closure valve for said admission opening, a spring yieldingly urging said valve into closed position, means releasable by contact of the instrument with the floor of the tank for holding the valve in a fully open position, and means made responsive to a valve-releasing activation of the first said means and functioning only while the instrument rests upon the floor of the tank for holding the valve in a predetermined partially open position.

3. In a liquid-sampling instrument for use in a tank to determine the level of a bottom liquid having a specific gravity higher than that of a principal body of liquid contained in the tank, a casing open at the head end and providing an admission opening at its lower end, a closure valve for said admission opening, means serving normally to hold the valve in a fully open position arranged upon a lowering of the instrument into the tank to make contact with the floor of the latter and acting in response to such contact to effectuate a release of the valve, and means made responsive to a valve-releasing activation of the first said means and itself functioning by contact with the floor of the tank to preclude a full closing of the valve until the instrument is raised off the floor of the tank, the floor contacts made by the two recited means being independent of one another.

4. In a liquid-sampling instrument for use in a tank to determine the level of a bottom liquid having a specific gravity higher than that of a principal body of liquid contained in the tank, a casing open at the head end and providing an admission opening at its lower end, a stem-carrying valve for the admission opening guidably supported for movement in a direction endwise to the stem, a spring yieldingly urging the valve into closed position, a tripping foot arranged when set to frictionally engage the stem and by said engagement hold the valve in normally open position and being tripped to release the valve upon contact with the floor of the tank, and means independent of said tripping foot for holding the released valve in partially open position while the instrument rests upon the bottom of the tank.

5. In a liquid-sampling instrument for use in a tank to determine the level of a bottom liquid having a specific gravity higher than that of a principal body of liquid contained in the tank, a casing open at the head end and providing an admission opening at its lower end, a valve for the admission opening having an upright stem and guidably supported for movement in a direction endwise to the stem, a spring yieldingly urging the valve into closed position, and a tripping foot carried by the casing for vertical swinging movement into and out of a horizontal position and presenting an aperture somewhat larger than the diameter of the stem and through which the stem extends, said foot when set to occupy an inclined position acting to frictionally bind the stem and being tripped to release the stem by contact with the floor of the tank.

6. In a liquid-sampling instrument for use in a tank to determine the level of a bottom liquid having a specific gravity higher than that of a principal body of liquid contained in the tank, a cylindrical valve casing counter-bored from the upper end and presenting an annular internal flange located below the ledge which is defined by said counter-bore, a cross-bar presenting a center aperture and seating by its ends upon said ledge, a tube extending upwardly as a prolongation of the casing and fitting by its lower end in the counter-bore with the bottom bearing upon and securing the seated ends of the cross-bar, a valve arranged to seat on said flange and presenting upper and lower stem sections extending as axial prolongations of the valve, a spring surrounding said upper stem between the valve and the cross-bar and urging the valve into seated position, and a foot member of inverted L-shape hingedly carried by the casing to occupy a position below the valve seat with one limb of said member being movable about one end as an axis from an upper horizontal position into a lower inclined position and having a central aperture for the reception of the lower stem therethrough and with the other limb depending from the free end of said horizontal limb and being movable by swing action of the foot member into a position exposing the toe below the lower end of the casing, said apertured limb when set in its said inclined position acting to frictionally bind the stem and being tripped to release the stem by contact of the exposed toe with the floor of the tank.

7. Structure according to claim 6 in which the lower stem is of such a length as to project slightly below the bottom end of the casing when the valve occupies its seated position.

HARRY E. BAKER.

REFERENCES CITED

The following references are of record in the file of this patent:

UNITED STATES PATENTS

| Number | Name | Date |
|---|---|---|
| 832,164 | Rutenber | Oct. 2, 1906 |
| 1,621,857 | Seraphin | Mar. 22, 1927 |
| 1,744,193 | Adams | Jan. 21, 1930 |
| 2,071,145 | Summers | Feb. 16, 1937 |
| 2,298,627 | Proudman et al. | Oct. 13, 1942 |